US011216143B1

(12) United States Patent
Lee et al.

(10) Patent No.: US 11,216,143 B1
(45) Date of Patent: *Jan. 4, 2022

(54) FORCE SENSING MODULE AND METHOD OF MANUFACTURING THE SAME AND ELECTRONIC DEVICE

(71) Applicant: TPK Touch Solutions (Xiamen) Inc., Fujian (CN)

(72) Inventors: Lien Hsin Lee, Taipei (TW); Ren Hung Wang, Taichung (TW); Wei Yi Lin, Taoyuan (TW); Fengming Lin, Tainan (TW); Wen Shan Cheng, Taoyuan (TW); Ming Hsien Ko, Taichung (TW); Yan Zhao, Xiamen (CN); Tai Shih Cheng, Taipei (TW)

(73) Assignee: TPK TOUCH SOLUTIONS (XIAMEN) INC., Fujian (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/017,767

(22) Filed: Sep. 11, 2020

(30) Foreign Application Priority Data

Jun. 16, 2020 (CN) .......................... 202010547927.2

(51) Int. Cl.
*G06F 3/045* (2006.01)
*G06F 3/041* (2006.01)

(52) U.S. Cl.
CPC ............ *G06F 3/045* (2013.01); *G06F 3/0412* (2013.01); *G06F 2203/04103* (2013.01); *G06F 2203/04105* (2013.01)

(58) Field of Classification Search
None
See application file for complete search history.

(56) References Cited

U.S. PATENT DOCUMENTS

| | | | |
|---|---|---|---|
| 2014/0313141 A1* | 10/2014 | Park | G06F 1/1635 345/173 |
| 2017/0010704 A1* | 1/2017 | Chen | G02F 1/133514 |
| 2017/0139514 A1* | 5/2017 | Kim | B22F 1/0025 |
| 2017/0344165 A1* | 11/2017 | Heo | G06F 3/04166 |
| 2018/0095580 A1* | 4/2018 | Yi | G06F 3/045 |
| 2018/0157364 A1 | 6/2018 | Frey et al. | |

FOREIGN PATENT DOCUMENTS

| | | |
|---|---|---|
| CN | 109219895 A | 1/2019 |
| KR | 20110120121 A | 11/2011 |
| KR | 20160032263 A | 3/2016 |

(Continued)

*Primary Examiner* — Brian M Butcher
(74) *Attorney, Agent, or Firm* — Cooper Legal Group, LLC (57) ABSTRACT

A force sensing module includes a first transparent electrode, a second transparent electrode, and a light-transmitting force-sensitive composite layer. The light-transmitting force-sensitive composite layer includes at least one light-transmitting electrode layer and at least one functional spacer layer. The light-transmitting electrode layer has a first resistivity. The functional spacer layer has a second resistivity greater than the first resistivity. The light-transmitting electrode layer and the functional spacer layer are stacked between the first transparent electrode and the second transparent electrode. The light-transmitting force-sensitive composite layer has an optical transmittance greater than 85% and a haze less than 3%.

20 Claims, 6 Drawing Sheets

(56) References Cited

FOREIGN PATENT DOCUMENTS

| | | | |
|---|---|---|---|
| KR | 20190052403 | A | 5/2019 |
| TW | 201405586 | A | 2/2014 |
| TW | 201514804 | A | 4/2015 |
| TW | I631502 | B | 8/2018 |
| TW | M604492 | U | 11/2020 |

\* cited by examiner

FORCE SENSING MODULE AND METHOD OF MANUFACTURING THE SAME AND ELECTRONIC DEVICE

CROSS-REFERENCE TO RELATED APPLICATION

This application claims priority to China Application Serial Number 202010547927.2, filed Jun. 16, 2020, which is herein incorporated by reference.

BACKGROUND

Technical Field

The present disclosure relates to a force sensing module and a method of manufacturing the same and an electronic device.

Description of Related Art

With the diversified development of touch modules, touch modules have been maturely applied to industrial electronics and consumer electronics products. Demand has progressed from determining the two-dimensional position (e.g., the X-axis direction and the Y-axis direction) of the touch point on the surface of the screen to also sensing the force parameter caused by the change of the force applied to the surface of the screen (e.g., the Z-axis direction) and even determining the level of pressing force in the Z-axis direction.

However, the conventional technology proposed by the existing industry has the following problems when the pressure sensor is mounted on the touch module: (1) the pressure sensor is an opaque unit, so in order not to affect the display transmittance, the pressure sensor can only be placed on the other side of the display module relative to the touch module, which limits the flexibility of integrated design; (2) since the opaque pressure sensor (Z-axis sensing) and the light-transmitting touch panel (XY-axes sensing) are separately arranged on both sides of the display module, the pressure sensor is not close to the actual pressing surface of the operator, which will cause a force transmission distortion effect; and (3) the pressure sensor must be attached to the back of the touch display and cannot be implemented externally.

Accordingly, how to provide a force sensing module and an electronic device to solve the aforementioned problems has become an important issue to be solved by those in the industry.

SUMMARY

An aspect of the disclosure is to provide a force sensing module and an electronic device that can efficiently solve the aforementioned problems.

According to an embodiment of the disclosure, a force sensing module includes a first transparent electrode, a second transparent electrode, and a light-transmitting force-sensitive composite layer. The light-transmitting force-sensitive composite layer includes at least one light-transmitting electrode layer and at least one functional spacer layer. The light-transmitting electrode layer has a first resistivity. The functional spacer layer has a second resistivity greater than the first resistivity. The light-transmitting electrode layer and the functional spacer layer are stacked between the first transparent electrode and the second transparent electrode. The light-transmitting force-sensitive composite layer has an optical transmittance greater than 85% and a haze less than 3%.

In an embodiment of the disclosure, the light-transmitting electrode layer is a silver nanowire electrode layer.

In an embodiment of the disclosure, the functional spacer layer is a substrate layer doped with a low concentration of silver nanowires.

In an embodiment of the disclosure, the substrate layer is compressible.

In an embodiment of the disclosure, a number of the at least one light-transmitting electrode layer is two. The functional spacer layer is stacked between the two light-transmitting electrode layers.

In an embodiment of the disclosure, a number of the at least one functional spacer layer is two. The light-transmitting electrode layer is stacked between the two functional spacer layers.

In an embodiment of the disclosure, a value of L* axis of CIELAB color space of the light-transmitting force-sensitive composite layer is in a range from about 90 to about 98.

In an embodiment of the disclosure, a value of a* axis of CIELAB color space of the light-transmitting force-sensitive composite layer is in a range from about −2.0 to about 0.

In an embodiment of the disclosure, a value of b* axis of CIELAB color space of the light-transmitting force-sensitive composite layer is in a range from about −2 to about 6.

According to an embodiment of the disclosure, an electronic device includes a cover plate, a display module, a touch module, and the foregoing force sensing module. The touch module is disposed between the cover plate and the display module. The force sensing module is disposed between the cover plate and the display module.

In an embodiment of the disclosure, the touch module is stacked between the cover plate and the force sensing module.

In an embodiment of the disclosure, the touch module is a one glass solution single-sided indium tin oxide (OGS-SITO) type touch module or a glass film (GF) type touch module.

In an embodiment of the disclosure, the force sensing module is stacked between the cover plate and the touch module.

In an embodiment of the disclosure, the touch module is a glass-film-double side (GF2) type touch module or a glass-film-film (GFF) type touch module.

In an embodiment of the disclosure, the touch module includes silver nanowire electrodes.

According to an embodiment of the disclosure, a method of manufacturing a force sensing module includes: (a) forming a light-transmitting force-sensitive composite layer on a first transparent electrode, in which the light-transmitting force-sensitive composite layer includes at least one light-transmitting electrode layer and at least one functional spacer layer, and a first resistivity of the light-transmitting electrode layer is smaller than a second resistivity of the functional spacer layer; and (b) forming a second transparent electrode on the light-transmitting force-sensitive composite layer.

In an embodiment of the disclosure, the step (a) includes: (a1) coating at least one conductive coating layer on the first transparent electrode; (a2) baking the conductive coating layer to form the light-transmitting electrode layer; (a3) coating at least one functional coating layer on the first transparent electrode; and (a4) baking the functional coating layer to form the functional spacer layer.

In an embodiment of the disclosure, the step (a1) is performed before the step (a3).

In an embodiment of the disclosure, the step (a1) is performed after the step (a3).

In an embodiment of the disclosure, the method further includes: (a5) repeating the steps (a1)-(a4) at least once.

Accordingly, in the force sensing module and the electronic device of the present disclosure, the light-transmitting force-sensitive composite layer stacked by the light-transmitting electrode layer with low resistivity and the functional spacer layer with high resistivity can have good optical properties (i.e., high optical transmittance and low haze) and a good force-resistance characteristic curve (i.e., tends to change linearly). Therefore, the force sensing module of the present disclosure can be disposed between the cover plate and the display module of the electronic device and has greater flexibility in integrated design. Not only that, since the force sensing module and the touch module can be disposed at the same side of the display module facing the cover plate, the force transmission distortion effect faced by the conventional technology can be effectively reduced.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 1:
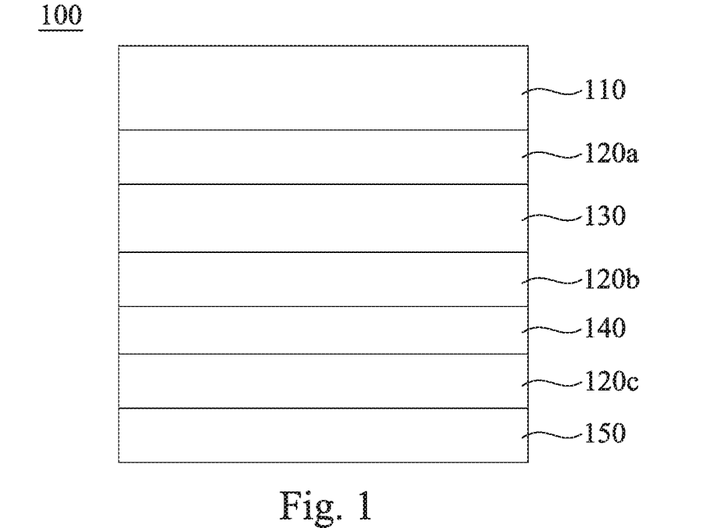
FIG. 1 is a schematic diagram of an electronic device according to an embodiment of the disclosure.

Reference is made to FIG. 1. FIG. 1 is a schematic diagram of an electronic device 100 according to an embodiment of the disclosure. As shown in FIG. 1, the electronic device 100 of the present embodiment is a touch display device, as an example, and includes a cover plate 110, adhesive layers 120a, 120b, 120c, a display module 150, a touch module 140, and a force sensing module 130. The touch module 140 is disposed between the cover plate 110 and the display module 150. The force sensing module 130 is disposed between the cover plate 110 and the display module 150. Specifically, the force sensing module 130 is stacked between the cover plate 110 and the touch module 140. The touch module 140 is stacked between the cover plate 110 and the display module 150. That is, the force sensing module 130 is located at a side of the touch module 140 adjacent to the cover plate 110, and the touch module 140 is located at a side of the force sensing module 130 adjacent to the display module 150. The adhesive layer 120a is adhered between the cover plate 110 and the force sensing module 130. The adhesive layer 120b is adhered between the force sensing module 130 and the touch module 140. The adhesive layer 120c is adhered between the touch module 140 and the display module 150.

In some embodiments, the touch module 140 shown in FIG. 1 may be a GF2 (Glass-Film-Double side) type touch module or a GFF (Glass-Film-Film) type touch module, but the disclosure is not limited in this regard. Specifically, the aforementioned GF2 type means that a touch driving electrode and a touch sensing electrode of the touch module 140 are respectively distributed on opposite sides of the same substrate. The aforementioned GFF type means that the touch driving electrode and the touch sensing electrode of the touch module 140 are respectively distributed on two substrates.

In some embodiments, a material of the cover plate 110 includes glass or a flexible polymer material, but the disclosure is not limited in this regard.

In some embodiments, at least one of the touch driving electrode or the touch sensing electrode of the touch module 140 may be a silver nanowire electrode layer, a metal grid, or an indium tin oxide (ITO) electrode layer, but the disclosure is not limited in this regard.

Figure 2:
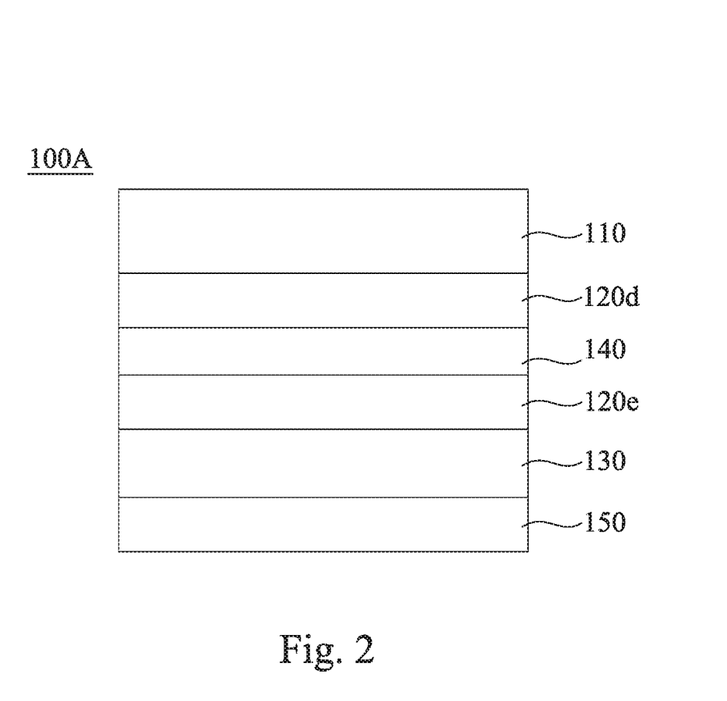
FIG. 2 is a schematic diagram of an electronic device according to another embodiment of the disclosure.

It should be noted that the stacking manner of the force sensing module 130 and the touch module 140 between the cover plate 110 and the display module 150 is not limited to FIG. 1. Reference is made to FIG. 2. FIG. 2 is a schematic diagram of an electronic device 100A according to another embodiment of the disclosure. As shown in FIG. 2, the electronic device 100A includes a cover plate 110, adhesive layers 120d, 120e, a display module 150, a touch module 140, and a force sensing module 130. The touch module 140 is disposed between the cover plate 110 and the display module 150 and configured to detect a two-dimensional position (for example, X-axis direction and Y-axis direction) of a touch point on a surface of the cover plate 110. The force sensing module 130 is disposed between the cover plate 110 and the display module 150 and configured to sense a force parameter caused by a force change applied to the surface of the cover plate 110 (i.e., Z-axis direction). Specifically, the touch module 140 is stacked between the cover plate 110 and the force sensing module 130. The force sensing module 130 is stacked between the touch module 140 and the display module 150. That is, the touch module 140 is located at a side of the force sensing module 130 adjacent to the cover plate 110, and the force sensing module 130 is located at a side of the touch module 140 adjacent to the display module 150. The touch module 140 is connected to the cover plate 110. The adhesive layer 120d is adhered between the touch module 140 and the force sensing module 130. The adhesive layer 120e is adhered between the force sensing module 130 and the display module 150.

In some embodiments, the touch module 140 as shown in FIG. 2 is an OGS-SITO (One Glass Solution single-sided ITO) type touch module or a GF (Glass Film) type touch module, but the disclosure is not limited in this regard. Specifically, the aforementioned OGS-SITO type means that the touch driving electrode and touch sensing electrode of the touch module 140 are formed on the lower surface of the cover plate 110, and the touch driving electrode is separated from the touch sensing electrode by an insulating material to form a structure similar to a bridge. The aforementioned GF type means that a single-layer thin film sensor of the touch module 140 is formed on a lower surface of the cover plate 110. It can be seen that the touch module 140 shown in FIG. 2 enables the cover plate 110 to also function as a capacitive sensor.

In some embodiments, at least one of the adhesive layers 120a, 120b, 120c, 120d, 120e is OCA (Optical Clear Adhesive), but the disclosure is not limited in this regard. Liquid OCA (LOCA) or pressure-sensitive adhesive (PSA) can also be selected as required.

In order to ensure that the electronic devices 100, 100A can still maintain good optical transmittance and display effect under the structural configurations in which the force sensing module 130 is disposed between the cover plate 110 and the display module 150, the structure of the force sensing module 130 in the present disclosure is modified as described below.

Figure 3:
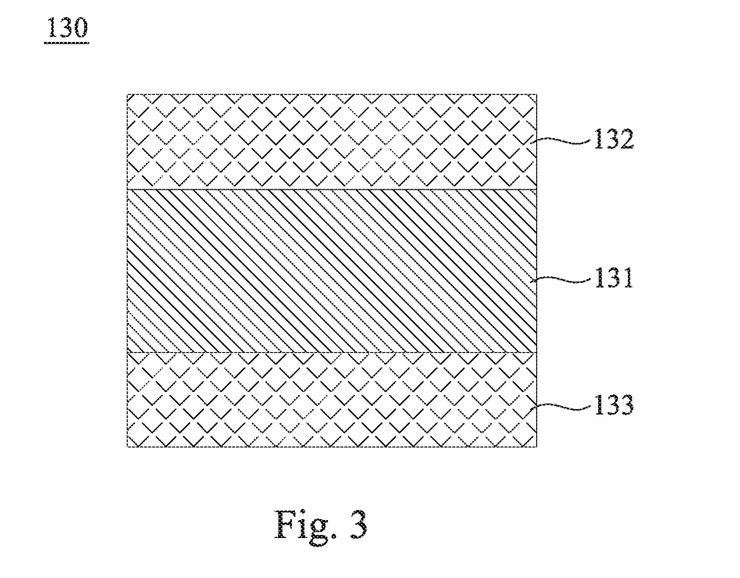
FIG. 3 is a schematic diagram of a force sensing module according to an embodiment of the disclosure.
Figure 4:
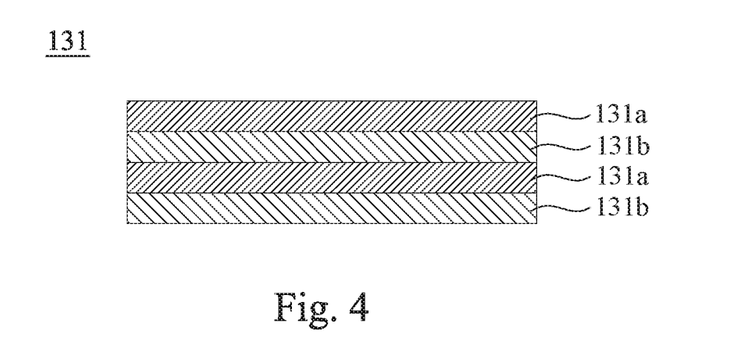
FIG. 4 is a schematic diagram of a light-transmitting force-sensitive composite layer according to an embodiment of the disclosure.

Reference is made to FIGS. 3 and 4. FIG. 3 is a schematic diagram of the force sensing module 130 according to an embodiment of the disclosure. FIG. 4 is a schematic diagram of a light-transmitting force-sensitive composite layer 131 according to an embodiment of the disclosure. As shown in FIGS. 3 and 4, the force sensing module 130 includes a first transparent electrode 132, a second transparent electrode 133, and a light-transmitting force-sensitive composite layer 131. The light-transmitting force-sensitive composite layer 131 includes light-transmitting electrode layers 131a and functional spacer layers 131b. The light-transmitting electrode layers 131a have a first resistivity. The functional spacer layers 131b have a second resistivity greater than the first resistivity. The light-transmitting electrode layers 131a and the functional spacer layers 131b are stacked between the first transparent electrode 132 and the second transparent electrode 133. The light-transmitting force-sensitive composite layer 131 has an optical transmittance greater than 85% to visible light (having a wavelength between 400 nm and 700 nm) and a haze less than 3%.

In some embodiments, the optical transmittance of the light-transmitting force-sensitive composite layer 131 is in a range from about 85.5% to about 91.5%, but the disclosure is not limited in this regard.

In some embodiments, the haze of the light-transmitting force-sensitive composite layer 131 is in a range from about 1.35% to about 2.65%, but the disclosure is not limited in this regard.

In some embodiments, the second resistivity is about 3 to about 50 times the first resistivity, but the disclosure is not limited in this regard.

Figure 5A:
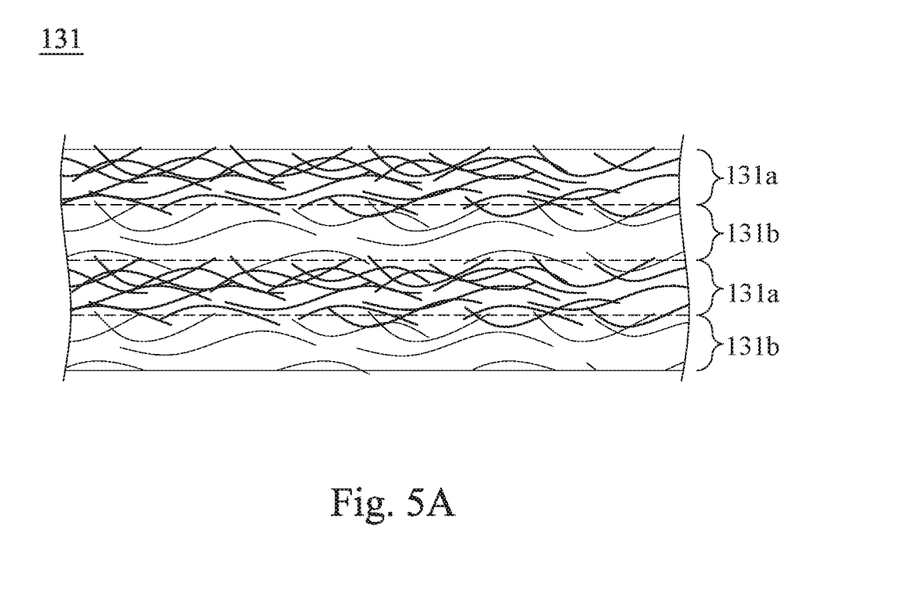
FIG. 5A is a partial enlarged view of the light-transmitting force-sensitive composite layer in FIG. 4 that is not pressed.

In order to make the light-transmitting force-sensitive composite layer 131 meet the aforementioned requirements for the optical transmittance and the haze, in some embodiments, the light-transmitting electrode layers 131a in the light-transmitting force-sensitive composite layer 131 are silver nanowire (SNW, also known as AgNW) electrode layers. Reference is made to FIG. 5A. FIG. 5A is a partial enlarged view of the light-transmitting force-sensitive composite layer 131 in FIG. 4 that is not pressed. As shown in FIG. 5A, the light-transmitting electrode layers 131a include a substrate and silver nanowires doped therein. The silver nanowires overlap each other in the substrate to form a conductive network. The substrate refers to a non-nanosilver material left on the first transparent electrode 132 and the second transparent electrode 133 after a solution including the silver nanowires is first formed on the first transparent electrode 132 and the second transparent electrode 133 by a method such as coating, and then heating and drying to volatilize the volatile substance. The silver nanowires are distributed or embedded in the substrate and partially protrude out from the substrate. The substrate can protect the silver nanowires from the external environment, such as from corrosion and abrasion. In some embodiments, the substrate is compressible.

In some embodiments, a wire length of the silver nanowires is in a range from about 10 μm to about 300 μm. In some embodiments, a wire diameter (or wire width) of the silver nanowires is less than about 500 nm. In some embodiments, an aspect ratio of the silver nanowires (the ratio of the wire length to the wire diameter) is greater than 10. In some embodiments, the silver nanowires may be deformed forms such as other conductive metal nanowires or non-conductive nanowires coated with silver. The use of the silver nanowires to form the silver nanowire electrode layers has the following advantages compared with ITO: low price, simple process, good flexibility, resistance to bending, and etc.

In order to make the light-transmitting force-sensitive composite layer 131 meet the aforementioned requirements for the optical transmittance and the haze, the functional spacer layers 131b in the light-transmitting force-sensitive composite layer 131 are light-transmitting coating layers formed on the light-transmitting electrode layers 131a. In some embodiments, as shown in FIG. 5A, the functional spacer layers 131b are substrate layers doped with a low concentration of silver nanowires. Specifically, the functional spacer layers 131b include a substrate and the low concentration of silver nanowires doped therein, so that the second resistivity of the functional spacer layers 131b are lower than the first resistivity of the light-transmitting electrode layers 131a, and the functional spacer layers 131b have greater optical transmittance than the first resistivity of the light-transmitting electrode layers 131a. In some embodiments, the substrate of the functional spacer layers 131b is identical to the substrate of the light-transmitting electrode layers 131a, but the disclosure is not limited in this regard.

Figure 5B:
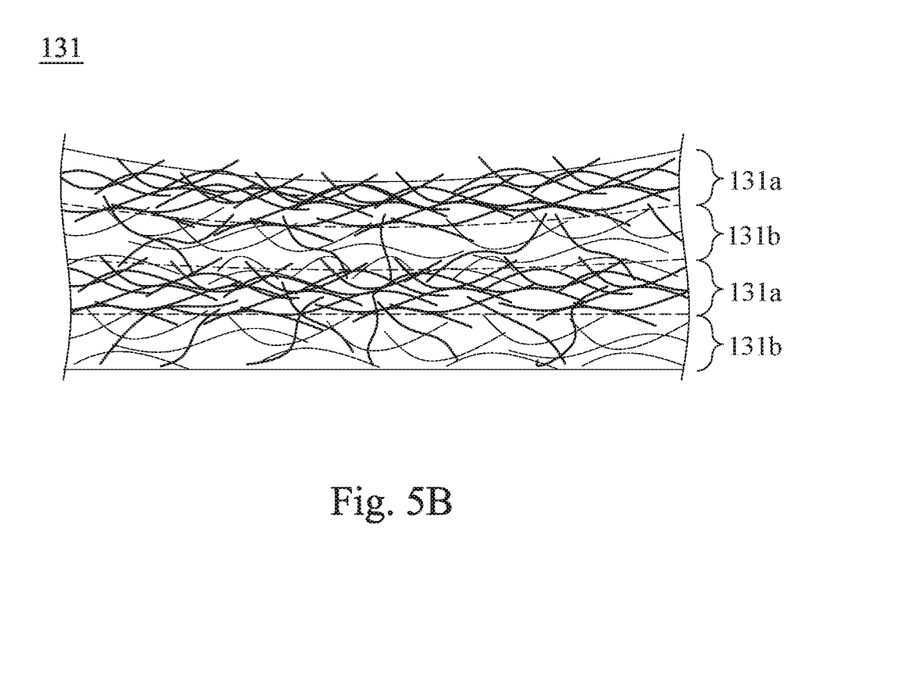
FIG. 5B is a partial enlarged view of the light-transmitting force-sensitive composite layer in FIG. 4 that is pressed.

Reference is made to FIG. 5B. FIG. 5B is a partial enlarged view of the light-transmitting force-sensitive composite layer 131 in FIG. 4 that is pressed. As shown in FIGS. 5A and 5B, since the light-transmitting electrode layers 131a are made of silver nanowires, when an external pressing force from the side of the cover plate 110 is transmitted to the force sensing module 130, the light-transmitting electrode layers 131a will be compressed by the force to cause the silver nanowires inside to approach and pass through the functional spacer layers 131b. When the number of contacting points increases, the overall conductivity of the light-transmitting force-sensitive composite layer 131 is improved (i.e., the resistivity decreases). Therefore, after the change in the resistivity of the light-transmitting force-sensitive composite layer 131 is detected by the electrical signal between the first transparent electrode 132 and the second transparent electrode 133, a pressure sensing chip (not shown) can calculate the value of the external pressing force. For example, if the external pressing force is large, the resistivity of the light-transmitting force-sensitive composite layer 131 has a greater amount of change; on the contrary, if the external pressing force is small, the resistivity of the light-transmitting force-sensitive composite layer 131 has a small amount of change. Therefore, the value of the external pressing force can be calculated by the change in resistivity of the light-transmitting force-sensitive composite layer 131.

In some embodiments, the resistivity of the light-transmitting electrode layers 131a is in a range from about 1 Ops (Ohm per Square) to about 150 Ops (preferably 60 Ops), and a thickness of the light-transmitting electrode layers 131a is in a range from about 1 nm to about 200 nm (preferably from about 40 nm to about 80 nm). In some embodiments, a thickness of the functional spacer layers 131b is in a range from about 40 nm to about 1500 nm (preferably from about 60 nm to about 100 nm).

As shown in FIG. 4, in the present embodiment, the light-transmitting force-sensitive composite layer 131 includes two light-transmitting electrode layers 131a and two functional spacer layers 131b. The light-transmitting electrode layers 131a and the functional spacer layers 131b are alternately stacked in series. However, the stacking manner of the light-transmitting electrode layers 131a and the functional spacer layers 131b is not limited to FIG. 4.

Figure 6A:
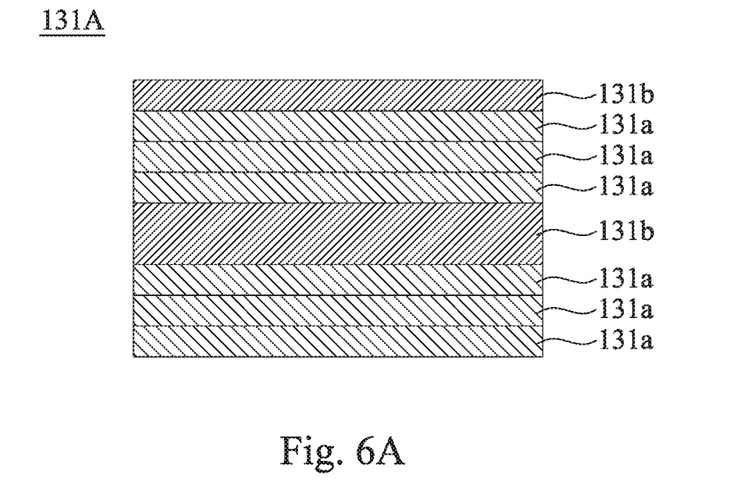
FIG. 6A is a schematic diagram of a light-transmitting force-sensitive composite layer according to another embodiment of the disclosure.

Reference is made to FIG. 6A. FIG. 6A is a schematic diagram of a light-transmitting force-sensitive composite layer 131A according to another embodiment of the disclosure. As shown in FIG. 6A, the light-transmitting force-sensitive composite layer 131A includes a plurality of light-transmitting electrode layers 131a and a plurality of functional spacer layers 131b, in which at least one of the functional spacer layers 131b is stacked between two of the light-transmitting electrode layers 131a. Specifically, the light-transmitting force-sensitive composite layer 131A includes six light-transmitting electrode layers 131a and two functional spacer layers 131b, in which three of the light-transmitting electrode layers 131a are located between the two functional spacer layers 131b, and the other three light-transmitting electrode layers 131a are located outside the two functional spacer layers 131b. In addition, in the present embodiment, the two functional spacer layers 131b are different in thickness. For example, the thickness of the functional spacer layer 131b stacked between the light-transmitting electrode layers 131a is greater than the thickness (for example, twice the thickness) of the functional spacer layer 131b not stacked between the light-transmitting electrode layers 131a.

Figure 6B:
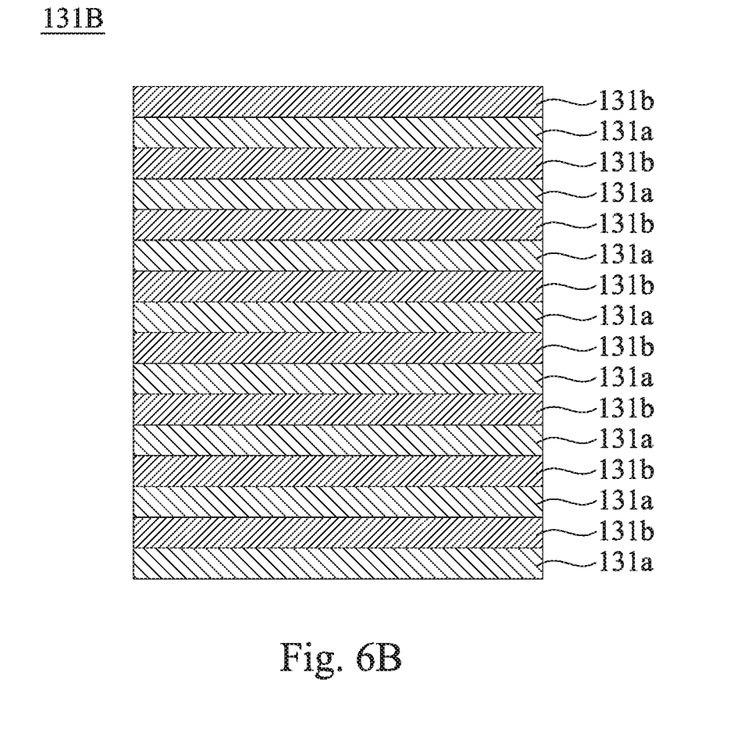
FIG. 6B is a schematic diagram of a light-transmitting force-sensitive composite layer according to another embodiment of the disclosure.

Reference is made to FIG. 6B. FIG. 6B is a schematic diagram of a light-transmitting force-sensitive composite layer 131B according to another embodiment of the disclosure. As shown in FIG. 6B, the light-transmitting force-sensitive composite layer 131B includes a plurality of light-transmitting electrode layers 131a and a plurality of functional spacer layers 131b, in which the light-transmitting electrode layers 131a and the functional spacer layers 131b are alternately stacked in sequence. Specifically, the light-transmitting force-sensitive composite layer 131B includes eight light-transmitting electrode layers 131a and eight functional spacer layers 131b.

Figure 6C:
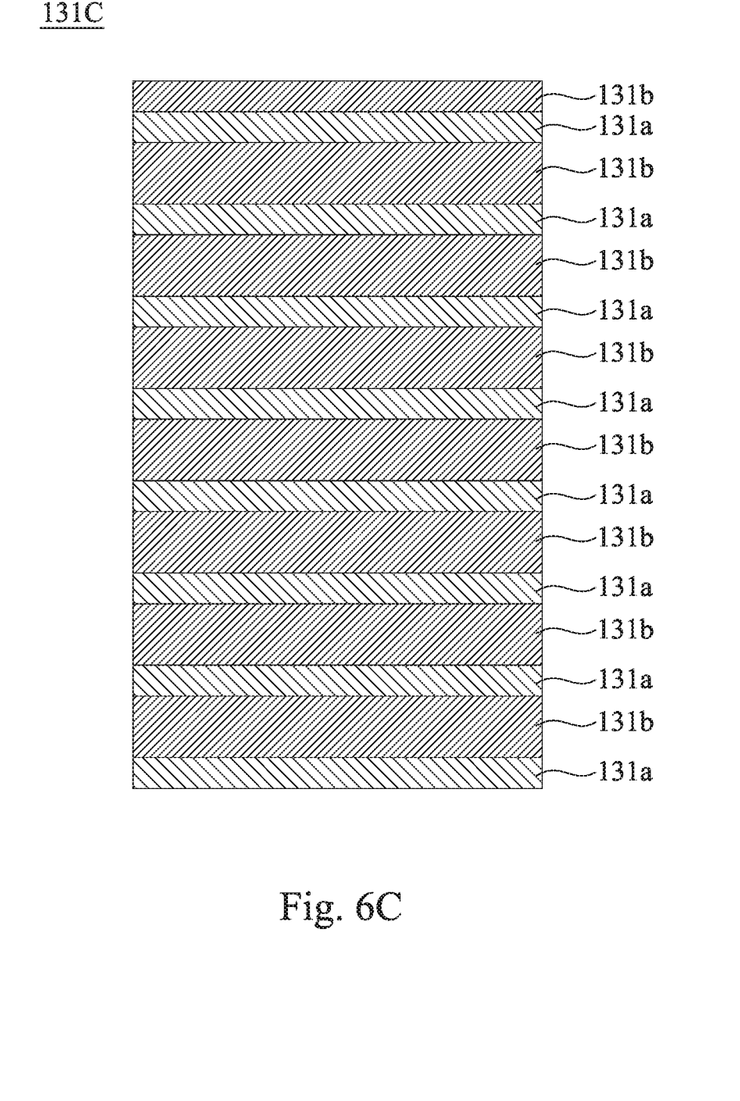
FIG. 6C is a schematic diagram of a light-transmitting force-sensitive composite layer according to another embodiment of the disclosure.

Reference is made to FIG. 6C. FIG. 6C is a schematic diagram of a light-transmitting force-sensitive composite layer 131C according to another embodiment of the disclosure. As shown in FIG. 6C, the light-transmitting force-sensitive composite layer 131C includes a plurality of light-transmitting electrode layers 131a and a plurality of functional spacer layers 131b, in which the light-transmitting electrode layers 131a and the functional spacer layers 131b are alternately stacked in sequence. Compared with the light-transmitting force-sensitive composite layer 131B shown in FIG. 6B, in the light-transmitting force-sensitive composite layer 131C of the present embodiment, the thickness of the functional spacer layer 131b stacked between any two of the light-transmitting electrode layers 131a is greater than the thickness (for example, twice the thickness) of the functional spacer layer 131b not stacked between any two of the light-transmitting electrode layers 131a.

By increasing the number of light-transmitting electrode layers 131a and/or functional spacer layers 131b and changing the stacking order of light-transmitting electrode layers 131a and functional spacer layers 131b, the light-transmitting force-sensitive composite layer 131 can have a good force-resistance characteristic curve (that is, tends to change linearly), so that the force level application can be realized. The total number of layers of the light-transmitting electrode layers 131a and the functional spacer layers 131b is 2 to 20, preferably 7. Furthermore, the force sensing module 130 can also select a suitable controller according to different force-resistance characteristic curves, so the design and manufacturing flexibility of the force sensing module 130 can be increased.

In some embodiments, the total number of layers of the light-transmitting electrode layers 131a and the functional spacer layers 131b included in the light-transmitting force-sensitive composite layer 131 is about 3 to about 21, but the disclosure is not limited in this regard.

In some other embodiments, if only to enable the force sensing module 130 to achieve its basic functions, the light-transmitting force-sensitive composite layer 131 may include only a light-transmitting electrode layer 131a and a functional spacer layer 131b.

In some embodiments, a value of L* axis (i.e., the luminance axis) of CIELAB color space of the light-transmitting force-sensitive composite layer 131 measured by a colorimeter is in a range from about 90 to about 98, but the disclosure is not limited in this regard.

In some embodiments, a value of a* axis (i.e., the red-green axis) of CIELAB color space of the light-transmitting force-sensitive composite layer 131 measured by a colorimeter is in a range from about −2.0 to about 0 (preferably in a range from about −0.5 to about 0.5), but the disclosure is not limited in this regard.

In some embodiments, a value of b* axis (i.e., the yellow-blue axis) of CIELAB color space of the light-transmitting force-sensitive composite layer 131 is in a range from about −2 to about 6 (preferably in a range from about −1.5 to about 3.0), but the disclosure is not limited in this regard.

In some embodiments, at least one of the first transparent electrode 132 or the second transparent electrode 133 may be an ITO electrode layer or an electrode layer including silver nanowires, but the disclosure is not limited in this regard.

Figure 7:
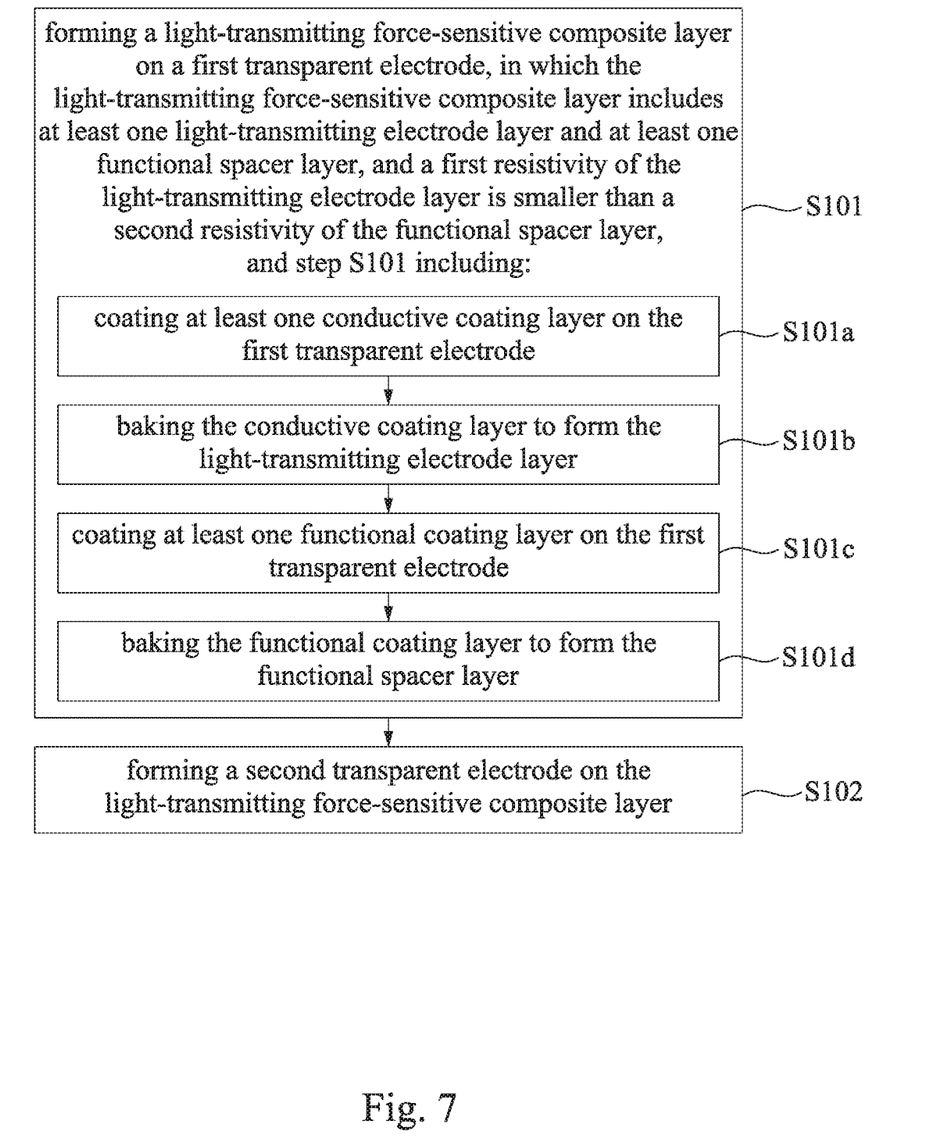
FIG. 7 is a flowchart of a method of manufacturing a force sensing module according to an embodiment of the disclosure.

Reference is made to FIG. 7. FIG. 7 is a flowchart of a method of manufacturing a force sensing module according to an embodiment of the disclosure. As shown in FIG. 7, the method of manufacturing a force sensing module includes step S101 and step S102.

In step S101, a light-transmitting force-sensitive composite layer is formed on a first transparent electrode, in which the light-transmitting force-sensitive composite layer includes at least one light-transmitting electrode layer and at least one functional spacer layer, and a first resistivity of the light-transmitting electrode layer is smaller than a second resistivity of the functional spacer layer.

In step S102, a second transparent electrode is formed on the light-transmitting force-sensitive composite layer.

In some embodiments, step S101 includes step S101a to step S101d.

In step S101a, at least one conductive coating layer is coated on the first transparent electrode.

In step S101b, the conductive coating layer is baked to form the light-transmitting electrode layer.

In step S101c, at least one functional coating layer is coated on the first transparent electrode.

In step S101d, the functional coating layer is baked to form the functional spacer layer.

In some embodiments, the coating process in step S101a and/or step S101c includes a spin coating process or a slit die coating process, but the disclosure is not limited in this regard.

In some embodiments, the baking process in step S101b and/or step S101d, for example, includes a pre-baking process performed at a baking temperature of about 70° C. to about 100° C. for about 20 minutes to about 40 minutes and/or an ultraviolet (UV) baking process performed with energy of about 3000 mJ, but the disclosure is not limited in this regard.

In some embodiments, step S101a is performed before step S101c. That is, after step S101 is completely performed, the light-transmitting electrode layer is located between the first transparent electrode and the functional spacer layer, and the functional spacer layer is located between the light-transmitting electrode layer and the second transparent electrode.

In some embodiments, step S101a is performed after step S101c. That is, after step S101 is completely performed, the functional spacer layer is located between the first transparent electrode and the light-transmitting electrode layer, and the light-transmitting electrode layer is located between the functional spacer layer and the second transparent electrode.

In some embodiments, step S101 further includes step S101e.

In step S101e, steps S101a-S101d are repeated at least once.

According to the foregoing recitations of the embodiments of the disclosure, it can be seen that the light-transmitting force-sensitive composite layer stacked by the light-transmitting electrode layer with low resistivity and the functional spacer layer with high resistivity can have good optical properties (i.e., high optical transmittance and low haze) and a good force-resistance characteristic curve (i.e., tends to change linearly). Therefore, the force sensing module of the present disclosure can be disposed between the cover plate and the display module of the electronic device and has greater flexibility in integrated design. Not only that, since the force sensing module and the touch module can be disposed at the same side of the display module facing the cover plate, the force transmission distortion effect faced by the conventional technology can be effectively reduced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A force sensing module, comprising:
    a first transparent electrode;
    a second transparent electrode; and
    a light-transmitting force-sensitive composite layer comprising:
        at least one light-transmitting electrode layer having a first resistivity; and
        at least one functional spacer layer having a second resistivity greater than the first resistivity, wherein the at least one light-transmitting electrode layer and the at least one functional spacer layer are stacked between the first transparent electrode and the second transparent electrode,
    wherein the light-transmitting force-sensitive composite layer has an optical transmittance greater than 85% and a haze less than 3%.

2. The force sensing module of claim 1, wherein the at least one light-transmitting electrode layer is a silver nanowire electrode layer.

3. The force sensing module of claim 1, wherein the at least one functional spacer layer is a substrate layer doped with a low concentration of silver nanowires.

4. The force sensing module of claim 3, wherein the substrate layer is compressible.

5. The force sensing module of claim 1, wherein a number of the at least one light-transmitting electrode layer is two, and the at least one functional spacer layer is stacked between the two light-transmitting electrode layers.

6. The force sensing module of claim 1, wherein a number of the at least one functional spacer layer is two, and the at least one light-transmitting electrode layer is stacked between the two functional spacer layers.

7. The force sensing module of claim 1, wherein a value of L* axis of CIELAB color space of the light-transmitting force-sensitive composite layer is in a range from about 90 to about 98.

8. The force sensing module of claim 1, wherein a value of a* axis of CIELAB color space of the light-transmitting force-sensitive composite layer is in a range from about −2.0 to about 0.

9. The force sensing module of claim 1, wherein a value of b* axis of CIELAB color space of the light-transmitting force-sensitive composite layer is in a range from about −2 to about 6.

10. An electronic device, comprising:
    a cover plate;
    a display module;
    a touch module disposed between the cover plate and the display module; and
    the force sensing module of claim 1 disposed between the cover plate and the display module.

11. The electronic device of claim 10, wherein the touch module is stacked between the cover plate and the force sensing module.

12. The electronic device of claim 11, wherein the touch module is a one glass solution single-sided indium tin oxide (OGS-SITO) type touch module or a glass film (GF) type touch module.

13. The electronic device of claim 10, wherein the force sensing module is stacked between the cover plate and the touch module.

14. The electronic device of claim 13, wherein the touch module is a glass-film-double side (GF2) type touch module or a glass-film-film (GFF) type touch module.

15. The electronic device of claim 10, wherein the touch module comprises silver nanowire electrodes.

16. A method of manufacturing a force sensing module, comprising:
(a) forming a light-transmitting force-sensitive composite layer on a first transparent electrode, wherein the light-transmitting force-sensitive composite layer comprises at least one light-transmitting electrode layer and at least one functional spacer layer, and a first resistivity of the at least one light-transmitting electrode layer is smaller than a second resistivity of the at least one functional spacer layer; and
(b) forming a second transparent electrode on the light-transmitting force-sensitive composite layer.

17. The method of claim 16, wherein step (a) comprises:
(a1) coating at least one conductive coating layer on the first transparent electrode;
(a2) baking the at least one conductive coating layer to form the at least one light-transmitting electrode layer;
(a3) coating at least one functional coating layer on the first transparent electrode; and
(a4) baking the at least one functional coating layer to form the at least one functional spacer layer.

18. The method of claim 17, wherein step (a1) is performed before step (a3).

19. The method of claim 17, wherein step (a1) is performed after step (a3).

20. The method of claim 17, further comprising:
(a5) repeating steps (a1)-(a4) at least once.

\* \* \* \* \*